(12) United States Patent
Sim

(10) Patent No.: US 10,911,545 B2
(45) Date of Patent: Feb. 2, 2021

(54) METHOD AND SYSTEM FOR CONTROLLING AUDIO-VIDEO-NAVIGATION (AVN) OF VEHICLE THROUGH SMART DEVICE

(71) Applicants: Hyundai Motor Company, Seoul (KR); Kia Motors Corporation, Seoul (KR)

(72) Inventor: Hyun Chul Sim, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 210 days.

(21) Appl. No.: 15/833,787

(22) Filed: Dec. 6, 2017

(65) Prior Publication Data
US 2018/0338005 A1    Nov. 22, 2018

(30) Foreign Application Priority Data

May 16, 2017   (KR) ......................... 10-2017-0060398

(51) Int. Cl.
| | | |
|---|---|---|
| *H04L 12/46* | (2006.01) | |
| *H04L 29/08* | (2006.01) | |
| *G01C 21/26* | (2006.01) | |
| *G01C 21/36* | (2006.01) | |

(52) U.S. Cl.
CPC ............ *H04L 67/125* (2013.01); *G01C 21/26* (2013.01); *H04L 12/4633* (2013.01); *H04L 67/141* (2013.01); *G01C 21/362* (2013.01)

(58) Field of Classification Search
CPC ..................................................... H04L 12/46
USPC .......................................................... 709/227
See application file for complete search history.

(56) References Cited

U.S. PATENT DOCUMENTS

| | | | |
|---|---|---|---|
| 8,855,847 B2 | 10/2014 | Uehara | |
| 9,549,153 B1* | 1/2017 | Delorenzi | ................ H04N 7/15 |
| 2014/0279868 A1* | 9/2014 | Astorg | .................... G06F 16/22 |
| | | | 707/609 |
| 2014/0289366 A1* | 9/2014 | Choi | ..................... G06F 9/4451 |
| | | | 709/218 |
| 2017/0214781 A1* | 7/2017 | Ichida | ................. H04M 1/6091 |
| 2018/0317073 A1* | 11/2018 | Taylor | ................ G06Q 30/0631 |

FOREIGN PATENT DOCUMENTS

| | | |
|---|---|---|
| KR | 10-2013-0127523 A | 11/2013 |
| KR | 10-2017-0002917 A | 1/2017 |

* cited by examiner

*Primary Examiner* — Sibte H Bukhari
(74) *Attorney, Agent, or Firm* — Morgan, Lewis & Bockius LLP

(57) ABSTRACT

A method and system for controlling an Audio Video Navigation (AVN) of a vehicle by a smart device are disclosed, which control the AVN by a smart device including a mobile phone carried by a passenger accommodated on a back seat of the vehicle, using beacon and physical web technologies, controlling various functions of the AVN embedded in the vehicle may include constructing a virtual tunnel connected to an Internet of Things (IoT) server, acquiring an external Uniform Resource Locator (URL) for a service from the IoT server, generating the acquired external URL as a beacon packet, and transmitting the generated beacon packet to the smart device using a Bluetooth Low Energy (BLE) signal within the vehicle.

12 Claims, 3 Drawing Sheets

METHOD AND SYSTEM FOR CONTROLLING AUDIO-VIDEO-NAVIGATION (AVN) OF VEHICLE THROUGH SMART DEVICE

The present application claims priority to Korean Patent Application No. 10-2017-0060398, filed on May 16, 2017, the entire contents of which is incorporated herein for all purposes by this reference.

BACKGROUND OF THE INVENTION

Field of the Invention

The present invention relates to a method and system for controlling an Audio-Video-Navigation (AVN) of a vehicle by a smart device, and more particularly to a method and system for controlling an AVN embedded in a vehicle by a smart device (such as a mobile phone) carried by a passenger accommodated on a back seat of the vehicle, using beacon and physical web technologies, thereby controlling various functions of the AVN embedded in the vehicle.

Description of Related Art

With increasing development of higher-end vehicles, the number of vehicles each having an Audio-Video-Navigation (AVN) is rapidly increasing. The AVN device is achieved by integrating an audio device, a multimedia device, and a navigation device into one system. A multimedia system and a navigation system are independently mounted to a conventional vehicle having no AVN. In contrast, according to an improved vehicle having the AVN device, a multimedia system and a navigation system are integrated into a single AVN device. Therefore, the AVN device may provide a driver of the vehicle with a navigation route and drive information, and may also provide the driver with a multimedia function that allows the driver to listen to music and broadcast programs as well as to view moving images.

Typically, since the AVN device is mounted to a center console (also called a center fascia) located between a driver seat and a passenger seat of the front seats of the vehicle, it is impossible for a passenger accommodated on a back seat of the vehicle to adjust sound volume of the AVN as well as to play (or reproduce) or control multimedia files stored in a mobile phone of the passenger.

Of source, assuming that a rear monitor is mounted to the back seat of the vehicle, the passenger accommodated on the back seat may control the stored multimedia files using a touchscreen or remote controller for the rear monitor. However, since the rear monitor is a high-cost device additionally mounted to the vehicle, the rear monitor is a separate solution irrelevant to issues to be solved by the present invention and, as such, a detailed description thereof is considered out of the question.

In the meantime, as a technology for allowing another passenger not located in the vicinity of the AVN device to easily control the AVN device, an improved method for allowing a passenger accommodated on the back seat to remotely control the AVN device through Wi-Fi hotspot connection has recently been developed. However, in order to use the AVN device using the hotspot, a driver or passenger must initially input a password or the like, such that unnecessary time and effort are needed.

Even in the case of using a Bluetooth function, the driver or passenger must manually select a corresponding Bluetooth device through execution of a Bluetooth setting function of a smart device, and must perform pairing of the selected device, resulting in greater inconvenience of use.

Therefore, many developers and companies are conducting intensive research into methods for allowing a passenger accommodated on a back seat of the vehicle to easily and conveniently control the AVN device embedded in the vehicle without using Bluetooth pairing or hotspot connection.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and system for controlling an Audio Video Navigation (AVN) of a vehicle by a smart device that substantially obviates one or more problems due to limitations and disadvantages of the related art.

Various aspects of the present invention are directed to providing a method for easily and conveniently controlling an AVN embedded in a vehicle using a smart device (including a mobile phone) carried by a passenger accommodated on a back seat of the vehicle, and a control system for implementing the same.

Various aspects of the present invention are directed to providing a method and system for controlling an AVN device embedded in a vehicle using a smart device, which can guarantee information security from external threats even when a passenger of the vehicle controls the AVN device and plays multimedia files using a smart device including a mobile phone through a wireless communication network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an Audio Video Navigation (AVN) of a vehicle using a smart device may include: constructing a virtual tunnel connected to an Internet of Things (IoT) server; acquiring an external Uniform Resource Locator (URL) for a service from the IoT server; generating the acquired external URL as a beacon packet; and transmitting the generated beacon packet to the smart device using a Bluetooth Low Energy (BLE) signal within the vehicle.

The beacon packet may be executed by the smart device such that the smart device controls the AVN by connecting to a service server.

In accordance with another aspect of the present invention, a system for controlling an Audio Video Navigation (AVN) of a vehicle using a smart device may include: a vehicle AVN having a communication module for communicating with an Internet of Things (IoT) server and a control module for controlling the AVN; a communication module for communicating with the AVN of the vehicle; an external Uniform Resource Locator (URL) generator; and a virtual tunnel module. The control module of the AVN may include: constructing a virtual tunnel between the AVN communication module and the virtual tunnel module of the IoT server; acquiring an external URL generated in an external URL generator of the IoT server; generating the acquired external URL as a beacon packet; and transmitting the generated beacon packet to the smart device using a Bluetooth Low Energy (BLE) signal within the vehicle.

The smart device may access a Web server configured to control functions of the AVN by executing the beacon packet.

The beacon packet may be executed through a physical-web application (PhysicalWeb App) embedded in the smart device.

The smart device may support a Bluetooth Low Energy (BLE) specification.

The external URL of the IoT server may be periodically changed.

The BLE signal may include a data signal having a format or a frame required in at least one of an iBeacon, Eddystone or RECO.

The beacon data signal of the Eddystone mode may be an Eddystone-URL frame data signal.

It is to be understood that both the foregoing general description and the following detailed description of the present invention are exemplary and explanatory and are intended to provide further explanation of the invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
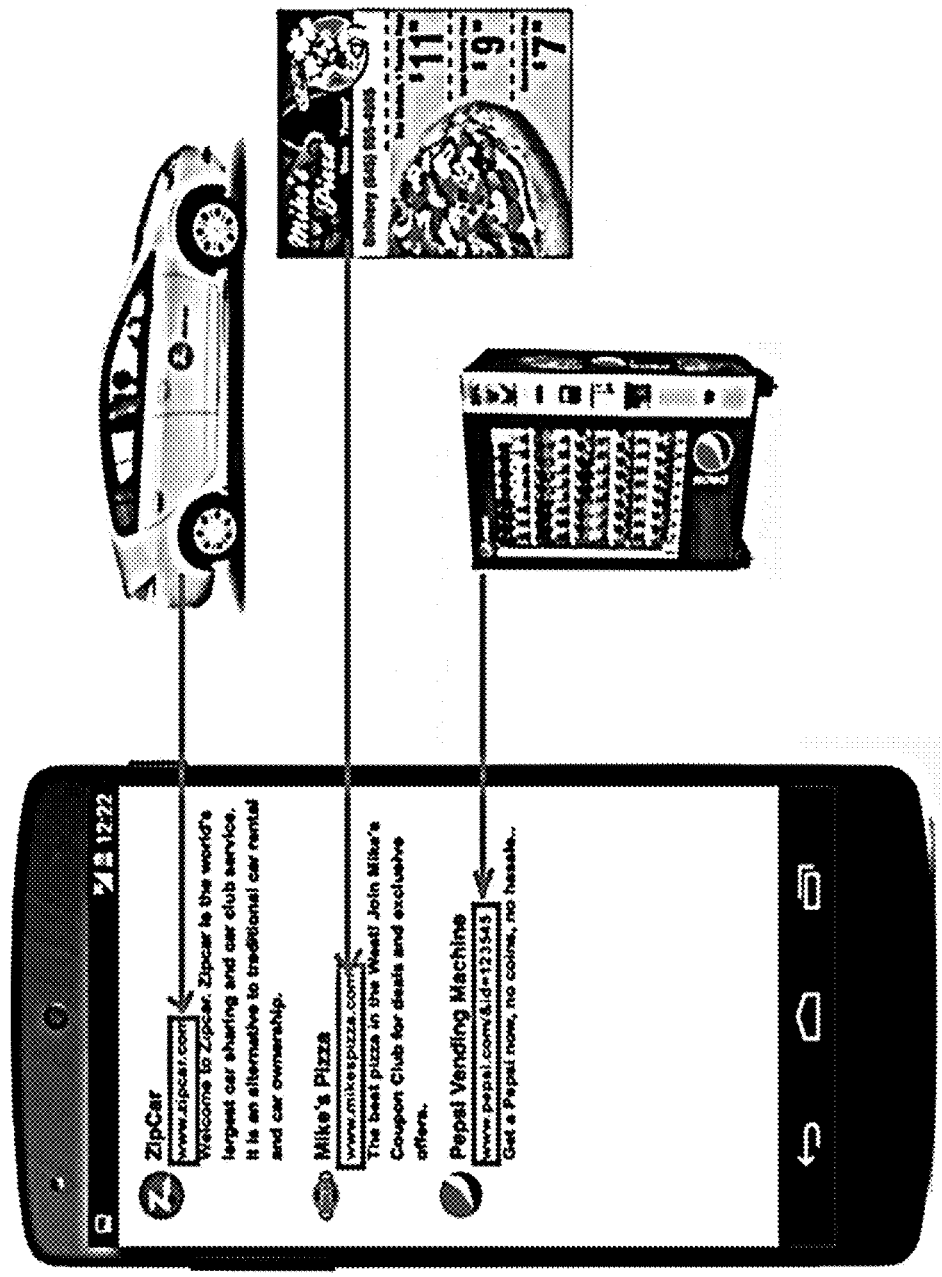
FIG. 1 is a view illustrating an exemplary embodiment of using a PhysicalWeb application (App) according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made more specifically to the exemplary embodiments of the present invention, exemplary embodiments of which are illustrated in the accompanying drawings, wherein like reference numerals refer to like elements throughout.

Embodiments of the present invention will be described more specifically so that those skilled in the art may readily implement the present invention. However, the present invention may be implemented in different manners and is not limited to the exemplary embodiments described herein.

Parts that are not related to a description of the present invention are omitted in the drawings and like reference numerals denote the same components throughout the disclosure.

In the present application, the terms "including" or "having" are used to indicate that features, numbers, steps, operations, components, parts or combinations thereof described in the present embodiment are present and presence or addition of one or more other features, numbers, steps, operations, components, parts or combinations is not excluded.

The same reference numerals used throughout the specification refer to the same constituent elements.

In the following description, known functions or structures, which may confuse the substance of the present invention, are not explained. While the present invention permits a variety of modifications and changes, specific embodiments of the present invention illustrated in the drawings will be described below more specifically. However, the detailed description is not intended to limit the present invention to the described specific forms. Rather, the present invention may include all modifications, equivalents, and substitutions without departing from the spirit of the invention as defined in the claims.

It will be understood that when one element is referred to as being "connected to" or "coupled to" another element, one element may be "connected to" or "coupled to" another element via a further element although one element may be directly connected to or directly coupled to another element.

All terms used herein, including technical or scientific terms, have the same meanings as understood by those skilled in the art. Terms defined in a generally used dictionary may be analyzed to have the same meaning as the context of the relevant art and may not be analyzed to have ideal or excessively formal meanings unless clearly defined in the present application. The terminology used in the present invention is for the purpose of describing particular embodiments only and is not intended to limit the disclosure.

Embodiment

Embodiments of the present invention will hereinafter be described with reference to FIG. 1, FIG. 2, and FIG. 3.

When a user accesses a Web server providing an AVN control service to control an AVN device (i.e., an in-vehicle AVN device) embedded in a vehicle using a smart device including a mobile phone, the exemplary embodiments of the present invention construct a virtual tunnel using a tunneling technology between the Web server and an IoT (Internet of Things) server through the AVN device, generate a beacon packet by acquiring an external uniform resource locator (URL) from the IoT server, transmit the beacon packet, and thus access the Web server for the AVN control service by executing a PhysicalWeb application (App) on the beacon packet.

Various technologies used in an exemplary embodiment of the present invention will hereinafter be briefly described.

Tunneling

Tunneling technology is a method for using the Internet as a portion of a private and safe network such that data transmission/reception can be achieved through connection between one network and another network. A virtual tunnel may be managed by encapsulating a network protocol in packets carried by a second network. For example, Microsoft's PPTP protocol may allow a user to use the Internet when data is transmitted through a virtual private network, because Microsoft's PPTP protocol inserts a unique network protocol into a TCP/IP packet transmitted through the Internet.

Here, the term "tunnel" may refer to a special passage through which messages or files of a certain company or organization can be transferred and move. The PPTP protocol has been provided to construct a virtual private network through the tunnel on the Internet. As a result, companies or organizations need not use a dedicated line anymore when constructing a Wide Area Network (WAN), and at the same time can safely use a public network.

Beacon Packet

First of all, the term "beacon" may refer to a device configured for transmitting a Bluetooth Low Energy (BLE) signal at intervals of a predetermined time, and may allow a user to recognize whether the user enters a beacon signal region, stays in the beacon signal region, or exits the beacon signal region. When the user enters the beacon signal region, a smartphone of the user may perform a specific operation upon receiving the BLE signal within the beacon signal region. As an exemplary embodiment of the specific operation, the smartphone may display event, coupon, exhibition information, etc. thereon.

Standards of beacon signals being widely used throughout the world may include i) Apple's iBeacon, ii) Google's Eddystone, and iii) RECO beacon. The RECO beacon may support another two standards or specifications of iBeacon and Eddystone.

All the above beacons could be available under Bluetooth Low Energy (BLE) (or Bluetooth 4.0), such that the above beacons can be used in all devices configured for supporting the BLE.

In the iBeacon mode, three packets, i.e., Universally Unique Identifier (UUID) (16 digits), Major (4 digits), and Minor (4 digits), may be transmitted. In the Eddyston mode, three frame data, i.e., UID, URL, and TLM, may be transmitted.

In the Eddystone mode, Eddystone URL frame is a sort of packet which is used with a browser instead of an application (App). The Eddystone-URL frame broadcasts a URL using a compressed encoding format to fit more within the limited advertisement packet. An application (App) to be used in a conventional beacon service needs to be separately planned and developed. In the conventional beacon service, if a user who has received a URL transmitted in a form of an Eddystone-URL frame clicks the corresponding URL, the user is connected to the corresponding URL through the web browser. That is, information is directly transmitted to a smartphone of the user through the URL, such that the user can view data through the browser. The above-mentioned function has already been developed as an open source project called "Physical Web" by Google.

Physical Web

Physical Web is an experiment for connecting things or objects to a web server. The Physical Web is an open approach to enable quick and seamless interactions with physical objects and locations. For the way of exemplary embodiment but not limitation, the Physical Web may be used as infrastructure that connects a bus stop sign to a specific URL (i.e., address on the web page) such that a bus user can acquire necessary bus schedule information without installation of a separate application (App). As a result, the Physical Web may allow 'smart' physical objects (i.e., things on the IoT) to be used like a legacy web service through only URLs of the physical objects even when the user does not download a separate application (App) for each smart physical object.

As can be seen from FIG. 1, a user downloads and installs the Physical Web App in a smartphone (e.g., Android phone or iPhone) such that a Bluetooth function of the smartphone is activated. As a result, when the user approaches any physical object (e.g., a vehicle, a beverage vending machine, a restaurant, or the like), a device configured for each physical object may transmit a beacon packet to the smartphone of the user. After the smartphone receives the corresponding beacon packet, if the received beacon packet is decoded by the smartphone, the user can view a URL of the corresponding object through the smartphone.

If the user selects and enters the corresponding URL, the user may conduct behavior related to desired products. For example, the user who selects the URL may reserve a vehicle sharing service or a rent-a-car service, may purchase a desired product from a vending machine through an In-App billing service, or may order a pizza at a restaurant.

As described above, the exemplary embodiments of the present invention may provide a solution for allowing a user to use an in-vehicle IoT device using a smart device, such that a passenger who rides in the vehicle can control an AVN device acting the in-vehicle IoT device using the smart device.

Figure 2:
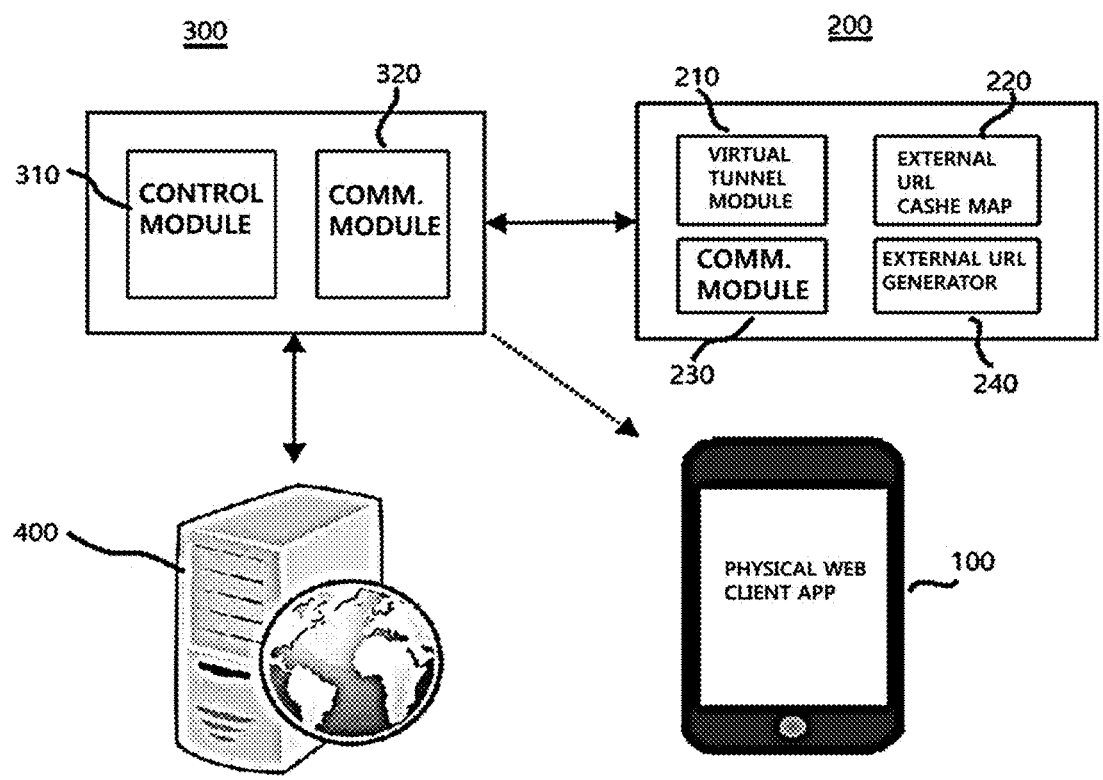
FIG. 2 is a diagram illustrating a system for controlling an audio video navigation (AVN) of a vehicle using a smart device according to an exemplary embodiment of the present invention.
Figure 3:
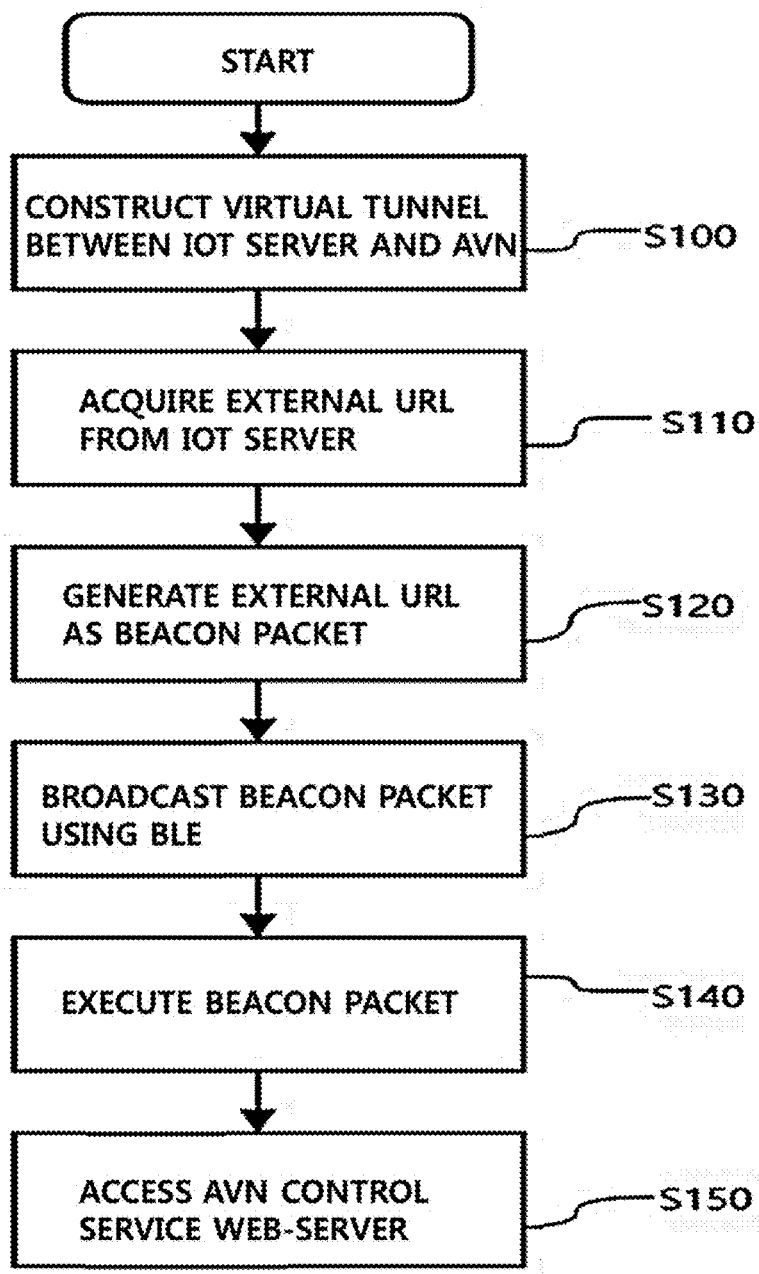
FIG. 3 is a flowchart illustrating a method for controlling an audio video navigation (AVN) of a vehicle using a smart device according to an exemplary embodiment of the present invention.

As can be seen from FIG. 2, a system for controlling the AVN of a vehicle using a smart device according to the exemplary embodiment of the present invention may include a smart device 100 including a mobile phone or tablet PC, and an AVN device 300 including a communication module 320 and a control module 310. Typically, the communication module 320 of the AVN 300 performs communication using an LTE modem, such that the communication module 320 is unable to use a fixed IP. Therefore, although there is no way to directly interconnect the smart device 100 and the AVN device 300, the exemplary embodiments of the present invention can indirectly connect the smart device 100 to the AVN device 300 using the above-mentioned tunneling technology.

For the present purpose, an IoT server 200, which is administrated by a manufacturing company of the AVN device 300 or by a manufacturing company of the corresponding vehicle, may function as a virtual tunnel between the smart device 100 and the AVN device 300. Of source, it should be noted that a separate service server can also be used as necessary. The IoT server 200 may include a virtual tunnel module 210 and a communication module 230. The IoT server 200 may further include an external URL generator 240, and an external URL cache map through which the external URL is maintained in a map with a cache.

The AVN control system using the smart device according to the exemplary embodiments of the present invention may further include an AVN control service web-server configured for storing and executing programs needed to control functions of the AVN device 300.

A method for controlling the AVN device of the vehicle using the smart device using the above-mentioned control system will hereinafter be described with reference to FIG. 3.

A control module 310 of the AVN device 300 of the vehicle may connect the communication module 320 to the IoT server 200, and the virtual tunnel module 210 of the IoT server 200 may construct a virtual tunnel between the IoT server 200 and the AVN device 300 (S100).

After completion of connection to the IoT server 200, the communication module 310 may acquire the external URL needed for services from the IoT server 200 (step S110). The AVN device 300 may generate the acquired external URL information as the above-mentioned beacon packet (S120). The beacon packet may be an Eddystone-URL formatted beacon optimized for the above Physical Web specification.

Thereafter, the AVN 300 may broadcast the generated beacon packet within the vehicle by adjusting the strength of a Bluetooth signal (S130).

A passenger accommodated on the back seat, who holds the smart device 100 having received the beacon packet, may execute the received beacon packet by the PhysicalWeb application (App) that has already been downloaded in the smart device 100 (S140), such that the passenger can connect to the URL denoted by the above beacon packet. Therefore, the smart device 100 of the passenger can access the AVN control service web-server 400 being currently driven in the AVN device 300 through the virtual tunnel constructed by the IoT server 200 (S150). Therefore, the AVN control command from the smart device 100 may be transferred to the Web server 400 through the IoT server, and the Web server 400 may control functions of the AVN device 300 in response to the received AVN control command.

In accordance with the above-mentioned AVN control method, a beacon packet being broadcast within the vehicle can allow the smart device 100 of the passenger accommodated on the back seat to easily connect to the Web server 400 even when the passenger does not use a password or other authentication means, such that the AVN device 300 may periodically change the IoT server 200's external URL to be broadcast through the beacon packet to another URL. In more detail, the external URL generator 240 of the IoT server 200 may periodically change the URL to another URL, and may transmit the changed URL to the AVN device 300. The AVN 300 having received the changed URL may change beacon transmission data. The reason why the AVN device 300 changes the beacon transmission data is to exclude the possibility that the passenger, who has controlled the AVN device 300 using the same beacon packet within the interior space of the vehicle, can continuously use the AVN device after leaving the vehicle.

As described above, since the IoT server 200 has the external URL cache map 220, the IoT server 200 may maintain the existing URL with a cache although the external URL is periodically changed by the server. If the IoT server 200 continuously stays in a connection state using only the existing URL during a predetermined time period, the user may feel uncomfortable when re-accessing the IoT server 200, such that it is preferable that the latest URL is automatically forwarded.

If the corresponding URL is not present in the URL cache map 220 of the server, the IoT server 200 may display an error message and then return to the beacon search box of the Physical Web App, such that the IoT server 200 may allow the passenger to access the latest URL.

As is apparent from the above description, the exemplary embodiments of the present invention can allow a passenger accommodated on a back seat of a vehicle to easily and conveniently control an AVN device (i.e., an in-vehicle AVN device) embedded in the vehicle using a smart device carried by the passenger, without using Bluetooth pairing or hotspot connection.

Furthermore, the exemplary embodiments of the present invention can guarantee information security from external threats even when a passenger of a vehicle controls an in-vehicle AVN device and plays multimedia files using a smart device including a mobile phone through a wireless communication network.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an Audio Video Navigation (AVN) of a vehicle using a smart device, the method comprising:
   constructing a virtual tunnel connected to an Internet of Things (IoT) server;
   acquiring an external Uniform Resource Locator (URL) for a service from the IoT server;
   generating the acquired external URL as a beacon packet;
   transmitting the generated beacon packet to the smart device using a Bluetooth Low Energy (BLE) signal within the vehicle;
   executing a Web server configured to control at least one function of the AVN;
   connecting the Web server to the smart device through the IoT server; and
   controlling the at least one function in a response to a control signal transmitted from the smart device to the Web server,
   wherein the transmitted beacon packet includes the external URL, and the external URL is periodically changed,
   wherein when the external URL is changed, an existing URL maintains and stores in the IOT server, and
   wherein when the IoT server continuously stays in a connection state using only the existing URL during a predetermined time period, a latest URL of changed external URLs is automatically forwarded.

2. The method according to claim 1, wherein the smart device is connected to the IoT server through execution of the beacon packet, wherein the execution of the beacon packet is achieved using a physical-web application (App) downloaded to the smart device.

3. The method according to claim 1, wherein the smart device is configured to support a Bluetooth Low Energy (BLE) specification.

4. The method according to claim 1, wherein the external URL of the IoT server is periodically changed.

5. The method according to claim 1, wherein the BLE signal is a data signal having a format or a frame required in at least one of an iBeacon, Eddystone or RECO.

6. The method according to claim 5, wherein a beacon data signal of a mode of the Eddystone is an Eddystone-URL frame data signal.

7. A system for controlling an Audio Video Navigation (AVN) of a vehicle using a smart device, the system comprising:
  a communication module including a processor and configured to communicate with an Internet of Things (IoT) server; and
  a control module including a processor and configured to control the AVN,
  wherein the control module of the AVN is configured to:
    construct a virtual tunnel between the AVN and a virtual tunnel module of the IoT server through the communication module, wherein the virtual tunnel module includes a processor;
    acquire an external Uniform Resource Locator (URL) generated in an external URL generator of the IoT server;
    generate the acquired external URL as a beacon packet; and
    transmit the generated beacon packet to the smart device using a Bluetooth Low Energy (BLE) signal within the vehicle,
  wherein the transmitted beacon packet includes the external URL, and the external URL is periodically changed,
  wherein when the external URL is changed, an existing URL maintains and stores in the IOT server,
  wherein when the IoT server continuously stays in a connection state using only the existing URL during a predetermined time period, a latest URL of changed external URLs is automatically forwarded, and
  wherein the control module of the AVN executes a Web server configured to control at least one function of the AVN, and then controls the at least one function in a response to a control signal transmitted from the smart device to the Web server when the Web server is connected to the smart device through the IoT server.

8. The system according to claim 7, wherein the smart device is connected to the IoT server through execution of the beacon packet,
  wherein the execution of the beacon packet is achieved using a physical-web application (App) downloaded to the smart device.

9. The system according to claim 7, wherein the smart device is configured to support a Bluetooth Low Energy (BLE) specification.

10. The system according to claim 7, wherein the external URL of the IoT server is periodically changed.

11. The system according to claim 7, wherein the BLE signal is a data signal having a format or a frame required in at least one of an iBeacon, Eddystone or RECO.

12. The system according to claim 11, wherein a beacon data signal of a mode of the Eddystone is an Eddystone-URL frame data signal.

* * * * *